3,262,471
Patented July 26, 1966

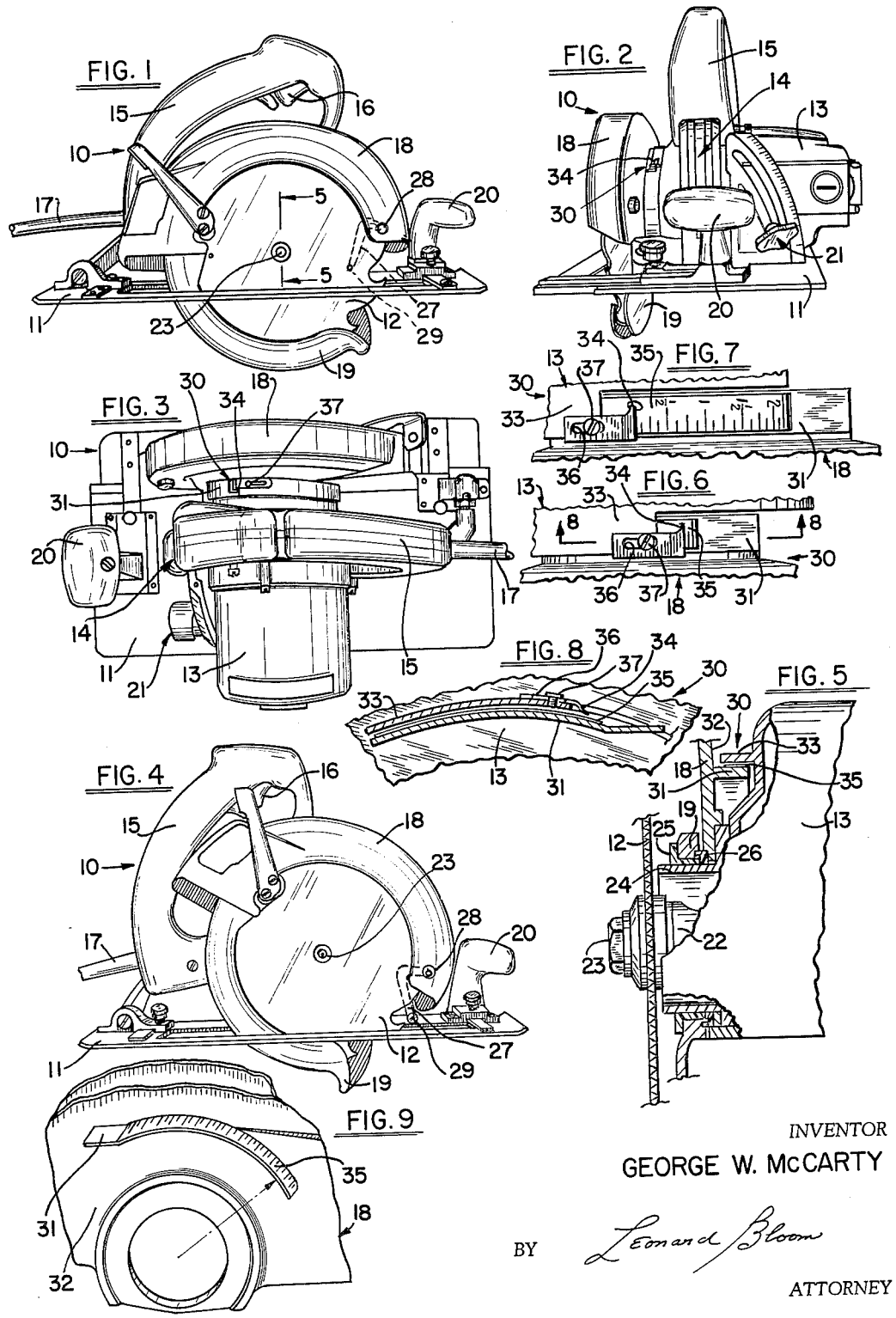

3,262,471
DEPTH CALIBRATION MEANS FOR PORTABLE POWER-DRIVEN SAW
George W. McCarty, Towson, Md., assignor to The Black and Decker Manufacturing Company, Towson, Md., a corporation of Maryland
Filed May 8, 1964, Ser. No. 366,022
6 Claims. (Cl. 143—43)

The present invention relates to a depth calibration means for a portable power-driven saw, and more particularly, to a depth calibration means having a scale and a cooperating indicator, both of which are readily visible to the operator in his normal position of handling and using the saw, and specifically, of looking down on the unit.

In the prior art structures of which I am aware, various means are provided to selectively raise or lower the motor housing, and hence the saw blade, of a portable electric saw in relation to the shoe plate upon which the housing is adjustably mounted, thereby facilitating a regulation in the depth of cut of the blade. Invariably, however, the graduated scale, which indicates the particular depth of cut, is located on the front or on the back of the unit, usually on the depth control member directly, and is therefore obscured from the operator's vision in his normal position of handling the saw. With the prior art structures, it is not possible for the operator to maintain his normal position in handling the saw, while easily adjusting the depth of cut of the saw blade and simultaneously viewing the scale to determine when the desired adjusted position has been reached. Instead, it is necessary for the operator to tilt the unit to one side, so that the scale becomes visible to him; or else, if the unit is supported upon a workpiece, it is necessary for the operator to lean over the unit and to asume a crouched or awkward position in viewing the graduated scale.

Accordingly, it is an object of the present invention to alleviate the aforementioned deficiencies of the prior art by providing, for use in conjunction with a portable power-driven saw, a depth calibration means having a scale which is readily visible to the operator in his normal position of handling and using the saw.

It is another object of the present invention to provide a depth calibration means which facilitates a quick, easy, and accurate adjustment in the depth of cut position of the saw blade.

It is yet another object of the present invention to eliminate the necessity for tilting the unit on its side, or for the operator to assume an awkward position, in order to determine the particular depth of cut of the saw blade.

It is a further object of the present invention to allow the operator to hold the unit in midair with one hand, release the depth control knob with his other hand, view the graduated scale directly without crouching over the saw, accurately select the desired position, and then easily tighten the knob once the selection is made.

It is a still further object of the present invention to provide a depth calibration means which includes means to change the position of the indicator with respect to the housing, thereby maintaining accuracy, as for example, whenever the blade is sharpened to a reduced diameter.

The present invention may be used in conjunction with a portable power-driven saw of the type having a shoe plate by means of which the unit is supported on a workpiece, a blade extending through the shoe plate to engage the work, a housing on the shoe plate with a motor to drive the blade, adjustable means to raise and lower the blade with respect to the shoe plate for selective depths of cut, a control handle on the housing, and a blade guard laterally of the handle.

The present invention comprises an improvement in the depth calibration means for the saw; and in accordance with the broad teachings of the present invention, the improved means comprises a scale positioned between the handle and the guard, such that the scale is readily visible to the operator in his normal position looking down on the unit. An indicating means is mounted on the unit to cooperate with the scale, and means are provided to obtain a proportional relative movement between the scale and the indicating means whenever the depth of cut is adjusted.

In accordance with the more preferred teachings of the present invention, the guard and the housing are rotatable, relative to one another, as the depth of the cut is adjusted; and the improved depth calibration means comprises a scale and a cooperating indicator means, one on the guard and the other on the housing, whereby a relative movement is obtained between the scale and the indicator means whenever the depth of cut is adjusted. The scale and the indicating means are mounted between the handle and the guard and are readily visible to the operator in his normal position looking down on the unit.

In accordance with the specific teachings of the present invention, the improved depth calibration means comprises a flange carried by the rotatable guard and projecting laterally therefrom away from the blade. A complementary flange is mounted on the housing, projects laterally therefrom towards the blade, and telescopes over the flange carried by the guard, with the two flanges being positioned between the handle and the guard. An indicating pointer is mounted on the complementary flange, and a cooperating graduated scale is on the flange carried by the rotatable guard. This graduated scale faces upwardly away from the shoe plate, becomes further exposed as the depth of cut is decreased from its maximum depth position, and along with the indicating pointer is readily visible to the operator in his normal position looking down on the unit. Preferably, the flanges are arcuately formed, concavely with respect to the shoe plate, and on a radius substantially from the axis of rotation of the guard, whereby the indicating pointer is substantially equidistant from the scale at all times. Preferably, the indicating pointer is mounted adjustably on the complementary flange, whereby the accuracy may be maintained whenever the blade is sharpened to a reduced diameter.

These and other objects of the present invention will become apparent from a reading of the following specification, taken in conjunction with the enclosed drawings, in which:

FIGURE 1 is a side elevation of a typical portable electric saw with which the teachings of the present invention may find particular utility;

FIGURE 2 is a front elevation of the saw unit of FIGURE 1;

FIGURE 3 is a top plan view thereof, showing the improved depth calibration means of the present invention located on the top of the unit, between the guard and the handle, and readily visible to the operator at all times;

FIGURE 4 is a side elevation corresponding substantially to that of FIGURE 1, but showing the saw blade raised to a shallower depth of cut position;

FIGURE 5 is a section view taken along the lines 5—5 of FIGURE 1, showing a preferred mounting for a rotatable upper guard;

FIGURE 6 is an enlarged fragmentary portion of the saw unit of FIGURE 3, showing the graduated scale and its cooperating indicating pointer, the scale and pointer being laterally reversed from their position in FIGURE 3 for ease of illustration;

FIGURE 7 is a view corresponding to that of FIGURE 6, but showing the scale and pointer in a different position, one corresponding to a raised position of the blade;

FIGURE 8 is a section view taken along the lines 8—8 of FIGURE 6; and

FIGURE 9 is a fragmentary perspective view of the rear of the rotatable upper guard, showing the manner in which the graduated scale is carried by the guard.

With reference to FIGURES 1–4, there is illustrated a portable electric saw 10 with which the teachings of the present invention may find particular utility. However, it will be appreciated that the invention is equally applicable to other types of portable power-driven saw units and the like and is not necessarily confined to the particular showing of the saw 10. With this in mind, the saw 10 comprises a substantially-flat shoe plate 11 by means of which the unit may be supported on a workpiece, a blade 12 extending through the shoe plate to engage the work, a housing 13 on the shoe plate with a motor (not shown) to drive the blade, an adjustable means, generally denoted as at 14, for raising or lowering the blade with respect to the shoe plate for selective depths of cut, a control handle 15 mounted on the housing, the handle being provided with a trigger switch 16 for energizing the unit from an electric line cord 17, an upper guard 18 for the blade, a lower guard 19 which is retracted within the upper guard upon engagement with the work, a front knob 20 to assist in handling the unit to make a cut, and another adjustable means, generally denoted as at 21, to facilitate a bevel cut.

The adjustable means 14 and 21, for the depth of cut and the bevel, respectively, form no part of the present invention, being described more particularly in the copending McCarty et al. application, Ser. No. 366,070, filed May 8, 1964 entitled "Depth and Bevel Adjustment Means for Portable Power-Driven Saw," and assigned to the assignee of the present invention.

In a preferred embodiment, the upper guard 18 is rotatably mounted on the housing 13, and this structure may be understood with reference to FIGURES 1, 4, and 5. The blade 12 is mounted on an arbor 22 by means of a lock nut 23, and the arbor is suitably journaled in a hub 24 formed integrally with the housing. The upper guard 18 is rotatably mounted on the hub, see FIGURE 5, with the lower guard 19 being mounted on the hub between a pair of bushings 25 and 26. A pivoted link 27, see FIGURES 1 and 4, has one of its ends pivotably mounted to the upper guard, as at 28, and has its other end 29 pivotably mounted to the shoe plate. In such a manner, the rotatably mounted upper guard 18 will pivot around the blade axis, see FIGURE 4, so as to maintain the front of the saw blade 12 substantially covered at all times. The link 27 is preferably bent into the general form of a bell crank, as shown, so as to minimize any interference with the operator's blade visibility. The pivoted link 27, which forms no part of the present invention, is explained in detail in the copending Elson application Ser. No. 366,343, filed May 11, 1964, entitled "Positioning Linkage for Rotatably Mounted Upper Guard of Portable Power-Driven Saw," and assigned to the assignee of the present invention.

With reference to FIGURES 5–9, the preferred depth calibration means of the present invention, generally denoted as at 30, includes a flange 31 (see FIGURE 9) which is secured externally to the inner wall 32 of the rotatable upper guard 18, and projects laterally therefrom in a direction away from the blade. Preferably, but not necessarily, the flange 31 is cast integrally with the upper guard. A complementary flange 33, see FIGURE 5, is mounted on the housing 13, projects laterally therefrom in a direction towards the blade, and telescopes over the flange 31 carried by the guard, with the two flanges (see FIGURE 3) being positioned between the handle 15 and the upper guard 18. An indicating pointer 34 is mounted on the flange 33, and a cooperating graduated scale 35 is carried on the flange 31. Preferably, but not necessarily, the scale 35 is formed with a pressure-sensitive adhesive backing for securing it to the flange 31.

Preferably, the graduated scale 35 faces upwardly away from the shoe plate, becomes further exposed as the depth of cut is decreased from its maximum depth of cut position, see FIGURES 6 and 7, and (along with the indicating pointer 34) is readily visible to the operator in his normal position looking down on the unit. Preferably, the flanges are arcuately formed, concavely with respect to the shoe plate and convexly when viewed from above the unit; and, as shown in FIGURE 9, the flanges are formed on a radius substantially from the axis of rotation of the upper guard 18, which results in the indicating pointer 34 being substantially equidistant from the scale 35 at all times. Preferably, as shown in FIGURES 3, 6, and 7, the scale 35 faces upwardly away from the shoe plate 11, such that the scale 35 and its indicating pointer 34 are readily visible to the operator in his normal position looking down on the unit.

The indicating pointer 34 has a slot 36, see FIGURES 6 and 7, and a screw 37 passes through the slot to secure the pointer to the flange 33 in the housing. The slot 36 facilitates an adjustment of the pointer 34, such that the accuracy of the calibration may be preserved even though the blade 12 is sharpened to a reduced diameter.

The present invention therefore facilitates a quick, easy, and accurate adjustment of the depth of cut without any necessity for the operator to crouch over the unit, to assume an awkward and uncomfortable position, or to tilt the unit on its side to view the graduated scale in determining the proper depth of cut. Instead, the scale is located in a convenient position and is readily visible to the operator in his normal position of handling and using the saw.

Obviously, many modifications may be made without departing from the basic spirit of the present invention; and accordingly, within the scope of the appended claims, the invention may be practiced other than has been specifically described herein.

I claim:

1. In a portable power-driven saw of the type having a shoe plate by means of which the unit is supported on a workpiece, a blade extending beyond the shoe plate to engage the work, a housing on the shoe plate with a motor to drive the blade, adjustable means to raise or lower the blade with respect to the shoe plate for selective depths of cut, a control handle on the housing, and a blade guard laterally of the handle, the guard and housing being rotatable relative to one another as the depth of cut is adjusted, a depth calibration means, comprising:
   (a) a scale and a cooperating indication means, one on the guard and the other on the housing, whereby a relative movement is obtained between said scale and said indication means whenever the depth of cut is adjusted;
   (b) said scale and indication means being mounted between said handle and guard and being readily visible to the operator in his normal position looking down on the unit; and
   (c) said indication means being adjustably mounted, whereby the accuracy may be maintained whenever the blade is sharpened to a reduced diameter.

2. In a portable power-driven saw of the type having a shoe plate by means of which the unit is supported on a workpiece, a blade extending beyond the shoe plate to engage the work, a housing on the shoe plate with a motor to drive the blade, adjustable means to raise or lower the blade with respect to the shoe plate for selective depths of cut, and a guard for the blade, the guard being rotated as the depth of cut is adjusted, a depth calibration means, comprising:
   (a) a scale and a cooperating indicator, one on the guard and the other on the housing;
   (b) said scale and indicator being readily visible to the operator in his normal position looking down on the unit; and (c) means to adjust the position of said indicator, whereby the accuracy may be maintained whenever the blade is sharpened to a reduced diameter.

3. In a portable power-driven saw of the type having a shoe plate by means of which the unit is supported on a workpiece, a blade extending beyond the shoe plate to engage the work, a housing on the shoe plate with a motor to drive the blade, adjustable means to raise or lower the blade with respect to the shoe plate for selective depths of cut, and a guard for the blade, the guard being rotated as the depth of cut is adjusted, a depth calibration means, comprising:

(a) an arcuate flange carried by the guard;

(b) said flange being convex when viewed from above the unit and being formed substantially on a radius from the axis of rotation of the guard;

(c) a graduated scale on said flange, said scale being readily visible from above the unit; and (d) cooperating indicating means carried by the housing, said indicating means being substantially equidistant from said scale at various adjusted positions of the depth of cut.

4. In a portable power-driven saw of the type having a shoe plate by means of which the unit is supported on a workpiece, a blade extending beyond the shoe plate to engage the work, a housing on the shoe plate with a motor to drive the blade, adjustable means to raise or lower the blade with respect to the shoe plate for selective depths of cut, a control handle on the housing, and a blade guard laterally of the handle, the guard being rotated as the depth of cut is adjusted, a depth calibration means, comprising:

(a) a flange carried by the guard and projecting laterally therefrom away from the blade;

(b) a complementary flange mounted on the housing, projecting laterally therefrom towards the blade, and telescoping over said flange carried by the guard;

(c) said flanges being positioned between the handle and guard;

(d) an indicating pointer adjustably mounted on said complementary flange; and (e) a cooperating scale on said flange carried by the guard;

(f) said scale becoming more exposed as the depth of cut is adjusted from its maximum depth position; and (g) said scale facing upwardly away from the shoe plate, whereby said scale and indicator are readily visible to the operator in his normal position looking down on the unit.

5. The depth calibration means of claim 4, wherein:

(a) said telescoping flanges are arcuately formed, concavely with respect to the shoe plate, on a radius substantially from the axis of rotation of the guard, whereby said indicating pointer is substantially equidistant from said scale at all times.

6. In a portable power-driven saw, the combination of a shoe plate for supporting the saw upon a workpiece, a blade extending beyond the shoe plate to engage the work, a housing structure comprising a motor housing with means therein for driving the blade, means for adjustably mounting the housing structure for movement as a unit vertically with respect to the shoe plate, whereby the housing structure and thereby the blade may be selectively raised and lowered into various depth-of-cut positions from a minimum to a maximum, respectively, an upper guard for the blade, the guard being rotatably supported for limited pivotal movement on the housing structure, and a depth calibration means, comprising:

(a) a scale and a cooperating indicator, one carried by the rotatably-supported guard, and the other carried by the housing structure;

(b) said scale being arcuately formed substantially on a radius from the pivot axis of the guard;

(c) whereby a proportional relative movement is obtained between said scale and indicator as the depth-of-cut is adjusted; and (d) means for adjusting the position of said indicator relative to said scale, thereby maintaining accuracy of the depth calibration means.

References Cited by the Examiner

FOREIGN PATENTS 557,670  6/1957  Belgium.

WILLIAM W. DYER, JR., *Primary Examiner.*

W. D. BRAY, *Assistant Examiner.*